United States Patent [19]

Gregory et al.

[11] 3,928,543

[45] Dec. 23, 1975

[54] MANUFACTURE OF NITRITES

[75] Inventors: Donald Dale Gregory, Wilmington, Del.; Martin Maurice Wendel, Glen Mills, Pa.

[73] Assignee: E. I. Du Pont de Nemours & Co., Wilmington, Del.

[22] Filed: Dec. 20, 1973

[21] Appl. No.: 426,654

Related U.S. Application Data

[63] Continuation-in-part of Ser. No. 213,930, Dec. 30, 1971, abandoned.

[52] U.S. Cl. .............................................. 423/385
[51] Int. Cl.² ......................................... C01B 21/50
[58] Field of Search ........................... 423/385, 235

[56] References Cited
UNITED STATES PATENTS 1,471,711  10/1923  Siebert ................................ 423/385
2,797,144  6/1957  Joris .................................... 423/385

FOREIGN PATENTS OR APPLICATIONS 106,944  1937  Australia ............................. 423/385

*Primary Examiner*—G. O. Peters

[57] ABSTRACT

Nitrites of ammonium, alkali metals and alkaline earth metals having minimum amounts of the corresponding nitrates are prepared by progressively reducing the concentration of oxides of nitrogen in a gaseous mixture which is reacted with an aqueous solution of base. The progressive reduction or dilution may be accomplished by adding an inert diluent gas to the gaseous mixture containing the oxides of nitrogen to diminish the nitrogen oxide concentration as the concentration of base in the aqueous solution decreases.

16 Claims, 2 Drawing Figures

3,928,543

MANUFACTURE OF NITRITES

CROSS REFERENCE TO RELATED APPLICATIONS

This application is a continuation-in-part of our co-pending application Ser. No. 213,930, filed Dec. 30, 1971, now abandoned.

BACKGROUND OF THE INVENTION

This invention relates to a process for making inorganic nitrites having a low percentage of the corresponding nitrates in a substantially neutral aqueous solution. Inorganic nitrites, especially sodium nitrite, are employed in the manufacture of numerous chemical compounds, e.g., diazo dyes, and are used in printing of textile fabrics and bleaching of various fabrics.

Methods of making inorganic nitrites are well known. Rothe, U.S. Pat. No. 1,070,070 discloses a process for producing nitrites wherein the ratio of nitric oxide to nitrogen dioxide is maintained at 1:1 or slightly above in order to achieve nitrites of a high grade of purity. Joris, U.S. Pat. No. 2,797,144, discloses a process for producing ammonium nitrite solutions whereby a nitrous gas and basic ammonium compound are passed into a first zone and absorption therein continued until ¼–¾ of the nitrogen oxide content of the gas is removed from the gas fed thereto; thereafter the unabsorbed gas is passed through successive absorption stages or zones so that there is maintained in the body of solution in each zone successively lower concentrations of basic ammonium compound in contact with nitrous gases successively less concentrated in nitrogen oxide constituents. The reduction in concentration of nitrogen oxide constituents is accomplished by absorption alone.

SUMMARY OF THE INVENTION

A process has been discovered whereby aqueous solutions of inorganic nitrites having low concentration of nitrates can be made.

The process of the present invention involves contacting a gaseous mixture containing oxides of nitrogen having a state of oxidation (as defined hereinbelow) of less than 70 percent with an aqueous solution of a base of a cation selected from ammonium, alkali metal cations and alkaline earth metal cations to produce the corresponding nitrite salt. As the concentration of base in the solution is reduced by absorption, the gaseous mixture is progressively reduced in concentration of nitrogen oxides by the addition of a diluent gas to said gaseous mixture in a continuous or staged manner. Continued or repeated contacting of the solution with gaseous mixture having a progressively diminished concentration of nitrogen oxides results in a nitrite product of high nitrite-to-nitrate ratio.

The ratio of partial pressure (in absolute atmospheres) of nitrogen oxides in the gaseous mixture to the concentration (in weight percent) of the base in the aqueous solution in contact with the mixture is less than about 4.5, usually less than 2.0, and preferably less than 0.5 when the concentration of the base in the aqueous solution is in the range 10–0.1 percent. Preferably a film of the aqueous solution of the base is maintained on all surfaces exposed to gases in any apparatus employed to effect absorption.

BRIEF DESCRIPTION OF THE DRAWING

The figures of the drawing are schematic diagrams of two apparatus which may be used to practice the present process.

DETAILED DESCRIPTION

Figure 1:
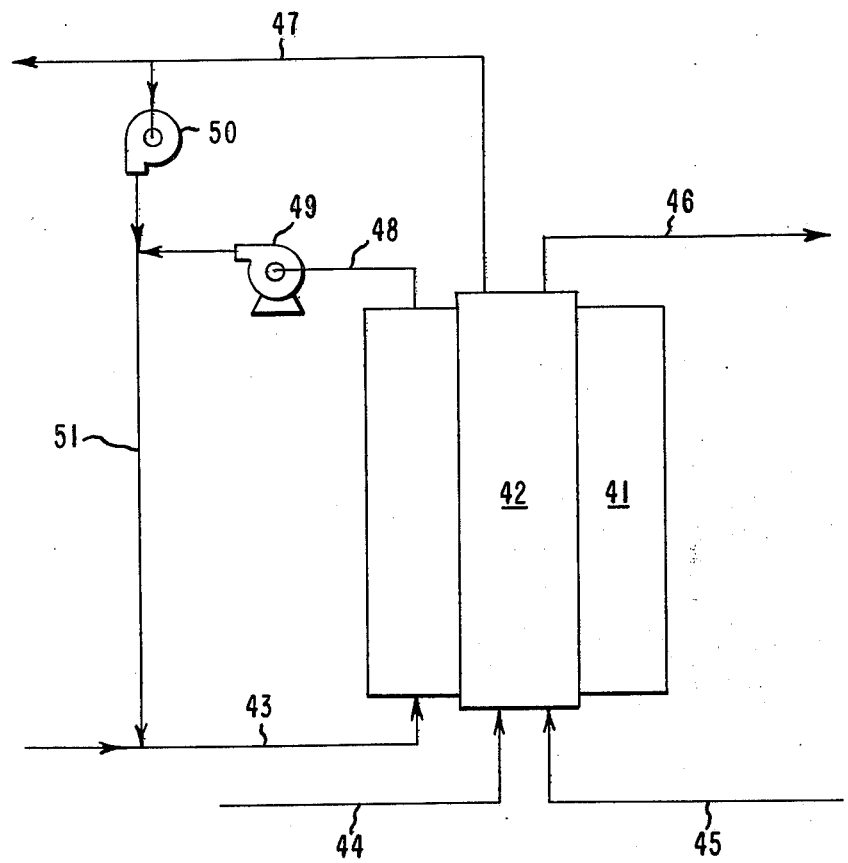

In a typical operation for the production of inorganic nitrites a gaseous mixture containing oxides of nitrogen is reacted with an aqueous solution of a base in two steps. In the first step a relatively concentrated aqueous solution of base is contacted with a gaseous mixture relatively concentrated in oxides of nitrogen to produce a partially neutralized liquor, commonly called a "green liquor." In the second, or finishing, step the green liquor is contacted with a gaseous mixture containing oxides of nitrogen to produce a substantially neutral solution of the nitrite salts.

The present invention is concerned with an improved process for the finishing step, either alone or in combination with the green liquor step. It has now been discovered that the ratio of nitrite to nitrate in the aqueous solution of the second step is increased when the concentration of the oxides in the gaseous mixture which is contacted with the aqueous solution containing base is progressively reduced as the concentration of base is reduced. The concentration of the oxides of nitrogen is reduced by adding a diluent gas to the gaseous mixture. The diluent gas can be relatively pure, e.g., nitrogen, or can be a mixture which is substantially inert towards the base. The diluent gas should not react with the oxides in the gaseous mixture to increase the state of oxidation of the gas or to produce nitrate-forming compounds, especially nitric acid; and to accomplish this objective, the concentration of oxygen and water in the gaseous mixture should be minimized, especially when the gaseous mixture has not yet contacted the alkaline solution.

A particularly suitable diluent gas is the off-gas from the tower which produced the green liquor as discussed hereinabove or the off-gas from this finishing process. The typical off-gases from the finishing operation have the following approximate analysis: (mole %) 1.8–3.5% $O_2$, 0.4–1.4% $NO_x$, 1.7–2.0% $H_2O$, 95% $N_2$ and 0.04% $CO_2$; and the off-gases from the preparation of the green liquor have the following approximate analysis: (mole %) 1.9–4.5% $O_2$, 0.2–0.3% $NO_x$, 1.7–2.0% $H_2O$ and 95–97% $N_2$.

The amount of diluent gas added to the gaseous mixture to obtain the desired ratio of oxides to base can vary with the concentration of the base in the aqueous solution. The amount of diluent gas is adjusted so that the ratio of partial pressure (in absolute atmospheres) of nitrogen oxides in the gaseous mixture to the concentration (in weight percent) of the base in the aqueous solution in contact with the mixture is less than 4.5, usually less than 2.0 and preferably less than 0.5 when the concentration of the base is in the range 10–0.1 percent. Practical design considerations, e.g., piping and equipment size, will dictate the degree of dilution within the aforementioned limits.

The increasing or progressive dilution may be conducted continuously or in stages. Although it will be apparent that continuously increasing dilution is theoretically preferred since the average concentration of oxides can be made to approach an optimum, practically and preferably, the dilution is staged in the manner described hereinbelow. The increasing dilution may be realized by maintaining the amount of rich gas constant while increasing the amount of inert diluent gas, decreasing the amount of rich gas while maintaining the inert gas constant or by decreasing in any other manner the proportion of rich gas relative to the inert diluent gas. Additional piping, etc., is minimized when the off-gas from a previous stage is passed through all succeeding stages, thereby providing an automatic accumulation of gas for increased dilution of the source gas.

Continuously increasing dilution in a batch operation may be accomplished by combining a stream of source gas and a stream of diluent gas prior to absorption and allowing the resulting gaseous mixture to pass into an absorption devise containing the aqueous solution of base. The dilution is increased by adjusting the flow rates of the two gas streams in the manner indicated above. The solution of base may remain in the absorption device throughout the operation or may be constantly recycled through the device. In the batch operation, the nitrite product is not removed from the system until the aqueous solution of base has been substantially neutralized.

Continuously increasing dilution in a continuous operation may be accomplished in various ways, including the use of the apparatus illustrated in FIG. 1 of the drawings. In this apparatus, the aqueous solution of base introduced via line 45 and the gaseous mixture containing the oxides of nitrogen introduced via line 44 are passed upwards through inner pipe 42 which is constructed from a semipermeable material. Inert gas is entered through line 43 and is passed upwards through outer pipe 41. The pressure within inner pipe 42 is considerably less than that in outer pipe 41 so that the inert gas may enter the inner pipe and dilute the gaseous mixture. Dilution of the gaseous mixture increases as the gases and solution pass upwards through the apparatus, due to the permeation of inert gas through the inner pipe. The off-gas from the absorption and/or the unused inert gas may be returned through lines 47 and 48, respectively, via line 51 to line 43 where each of these gases may also serve as diluent gas once the process has been initiated. Compressors 49 and 50 operate to increase the pressure of the gases in lines 48 and 47, respectively, to any desired value for reuse. In the continuous operation, the nitrite product is continuously removed from the system while the absorption reaction is continued.

The dilution, whether continuous or in stages, is increased as a function of the reduction in concentration of base. The addition of a diluent gas in the process of the invention is quite different from the much-smaller amount of effective dilution which occurs when nitrogen oxides are absorbed from the gaseous mixture without the addition of a diluent gas.

The gaseous mixture of nitrogen oxides can be obtained from any manufacturing operation which generates the same. The preferred source of the gaseous mixture of nitrogen oxides which is employed in the present invention is the ammonia-oxidation process such as described in general terms in U.S. Pat. Nos. 1,735,342 and 1,708,685 and in detail in the publication entitled "The Manufacture of Nitric Acid by Oxidation of Ammonia" by Thomas H. Chilton, *American Institute of Chemical Engineering*, 1960. A typical gaseous mixture contains, in parts by volume based upon the total parts of the mixture, 0–10 parts oxygen, 2–12 parts nitrogen oxides at a state of oxidation (as defined hereinbelow) of less than 70 percent, 15–20 parts water vapor, 83–58 parts inert gas (e.g., nitrogen) and is at a pressure in the range 2–150 psig and a temperature above the dew point of the mixture and usually initially greater than 900°C.

Preferably, the gaseous mixture contains in parts by volume based upon the total parts of the mixture 9.0–11.5 parts nitrogen oxides, 0–5.5 parts oxygen, 16–22 parts water vapor, 65–70 parts inert gas (principally nitrogen) and a minimum of carbon dioxide (e.g., 0.01–0.05 parts). This mixture is at a temperature initially greater than about 900°C. and a pressure in the range 2–150 psig. The time between formation of this mixture and its introduction to the basic solution should be minimized to prevent excessive oxidation of the nitrogen oxides which occurs more rapidly as the gas temperature is reduced.

An important variable in the present invention is the state of oxidation of the nitrogen oxides in the gaseous mixture. The state of oxidation is defined by the following equation:

$$\% \text{ State of oxidation} = \frac{\text{moles eNO}_2}{\text{moles NO} + \text{moles eNO}_2} \times 100,$$

wherein $eNO_2$ is determined by adding two times the number of moles of $N_2O_4$ to the number of moles of $NO_2$. The state of oxidation is controlled, for instance, by the relative amounts of oxygen and ammonia introduced to the ammonia oxidation and the conditions under which the oxidation is conducted. The formation of nitrite is favored by a low state of oxidation in the gaseous mixture which, as set forth above, is less than 70 percent, preferably less than 50 percent, and most preferably in the range 20–40 percent.

The preferred base for employment in the practice of the present invention is sodium hydroxide in an aqueous solution. In general, soluble bases such as ammonium, alkali and alkaline earth metal hydroxides and carbonates, e.g., sodium carbonate, potassium hydroxide, lithium carbonate, cesium hydroxide, etc. may be employed. Of course, the base selected should be sufficiently soluble at the reaction temperatures and should produce a solution having satisfactory handling characteristics. The aqueous base is maintained at a temperature in the range 30°–120°C. and preferably 50°–70°C. while in contact with the gaseous mixture. The process is operated at a pressure in the range 2–150 psig and preferably 60–90 psig. It is believed that the ratio of nitrite to nitrate varies inversely with the pressure and temperature.

An especially preferred form for the base is in an aqueous solution containing some nitrite salts and usually less than 15 percent by weight of base which solution in nitrite production is made in the first step of the typical nitrite process described hereinabove and is commonly referred to as green liqour. Generally this liquor is made by contacting a gaseous mixture relatively concentrated in nitrogen oxides with a relatively concentrated aqueous solution of base. A preferred green liquor is produced according to the process disclosed in copending application Ser. No. 24,643 filed on Apr. 1, 1970 by M. M. Wendel, now abandoned.

More particularly the green liquor is prepared by forming a gaseous mixture comprising in parts by volume based upon the total parts of the gaseous mixture 0–10 parts oxygen, 2–12 parts nitrogen oxides at a state of oxidation of less than 70 percent, 15–20 parts water vapor and 83–58 parts inert gas at a pressure in the range 2–150 psig and a temperature above the dew point of said mixture and in the range 300°–500°C. and rapidly quenching the mixture to a temperature less than about 120°C. The quenching is conducted in an absorption device by dispersing the mixture into intimate contact with an aqueous solution containing 1–73 percent by weight of a base such as ammonium and alkali and alkali metal hydroxides and carbonates. During the quenching the solution is maintained at temperatures in the range 30°–120°C.

The gaseous mixture from the quenching step is contacted with additional amounts of the aqueous solution of said base, until a total of at least 90 percent of the nitrogen oxides originally present are removed from the gaseous mixture. Preferably 20 to 60 parts by weight of the solution of aqueous base are contacted with each part by weight of the gaseous mixture at a temperature in the range 50°–70°C. A typical analysis of the green liquor from the above described process is (by weight) 9–13% NaOH, 0.5% $Na_2CO_3$, 50–60% $H_2O$, 25–40% $NaNO_2$ and 0.1–0.3% $NaNO_3$.

Preferably, in the green liquor process a film of the aqueous solution of base is maintained on all surfaces of the absorption device, provided that such surfaces are in contact with the gaseous mixture and are at temperatures below the dew point of said mixture. If the gases are permitted to contact surfaces which are not wet with base and which are at temperatures below the dew point of the gaseous mixture, water is condensed from the gases with the resultant formation of nitrates via the absorption of the nitrogen dioxide, or di-nitrogen tetroxide in water and the formation of nitric acid. Any surfaces of the absorption apparatus which can come into contact with the gases should be covered with a film of the aqueous base so that the formation of nitrite remains the predominate reaction. Methods for accomplishing this are obvious to one skilled in the art.

When the process of the present invention is operated in conjunction with the above described process for the production of green liquor and especially when the tail gas from the present process is scrubbed with high strength caustic, e.g., 35–50 percent by weight aqueous NaOH, to remove traces of nitrogen oxides before the caustic is introduced to the quenching operation, an amount of $CO_2$ at least equal to the $CO_2$ introduced to the system must be purged from the tail gas. This purge will prevent buildup of $Na_2CO_3$ in the quenching step.

Figure 2:
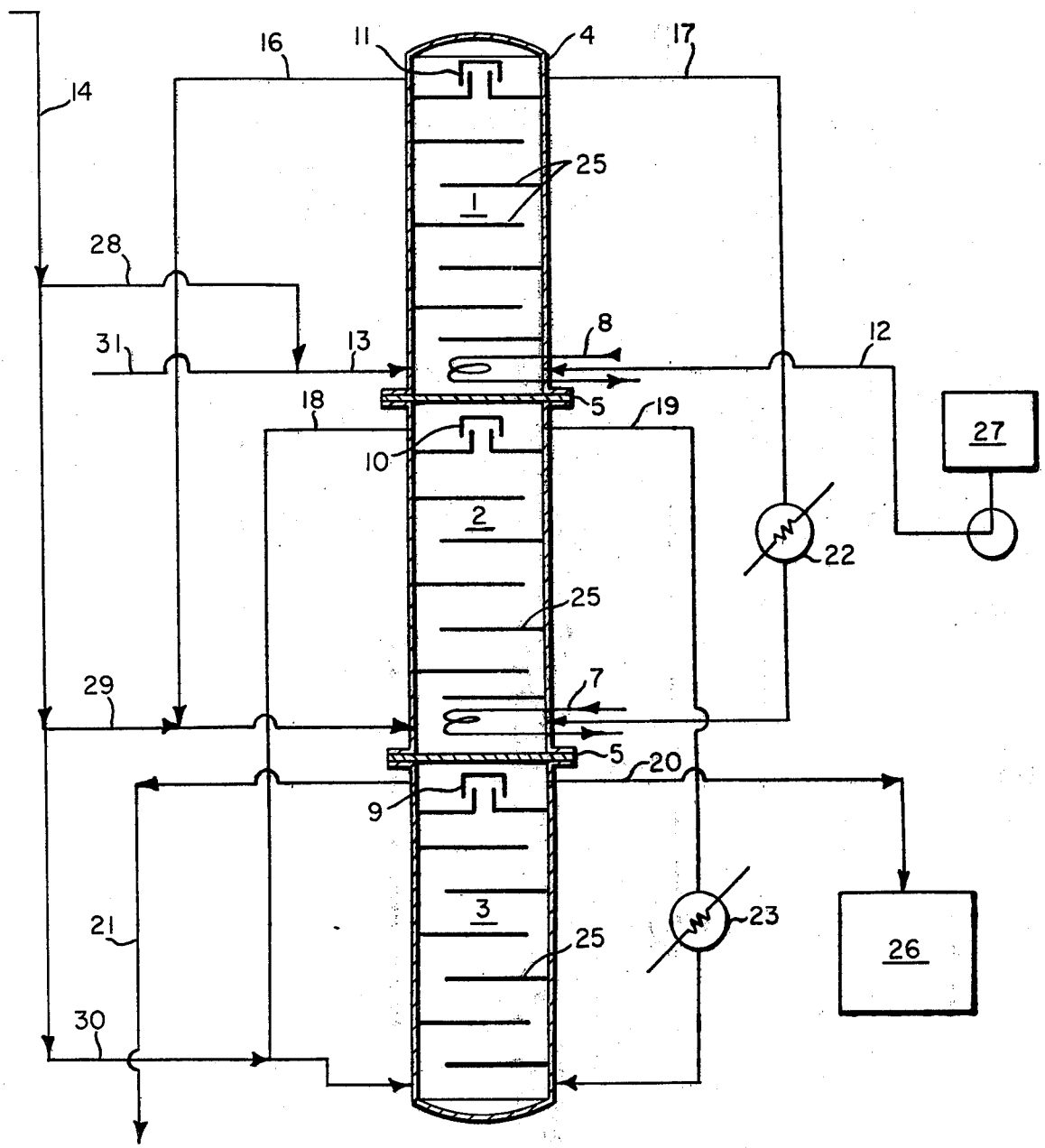

For a more complete understanding of the process of the present invention reference is made to FIG. 2 of the drawing accompanying and made a part of this specification. FIG. 2 is a schematic diagram of an apparatus used to practice the present process. Absorption column 4 is provided with stages 1, 2 and 3, which are separated by disks 5. Cooling coils 7 and 8 are provided in stages 1 and 2 and vapor-liquid separators 9, 10 and 11 of the "high-hat" variety are provided in all stages. The feed of aqueous base to column 4 is provided via line 12 from storage tank 27 and diluted gas is introduced into the first stage via line 13. Oxides of nitrogen are provided for each stage through hot gas header 14 which is usually a side-stream draw-off from an ammonia oxidation process unit and feeds gas to lines 28, 29 and 30. Substantially inert gas is introduced into the first stage through line 31. Line 16 delivers inert gas from the vapor space above the stage 1 to the bottom of stage 2, and line 18 delivers inert gas from the vapor space above stage 2 to the bottom of stage 3. Waste gas which is saturated with water vapor under the conditions of operation is withdrawn from the top of stage 3 through line 21. Optionally the minor amounts of nitrogen oxides in the waste gas may be removed by scrubbing the gas with strong base before discharge. As described above, a purge of $CO_2$ must be taken if this option is used.

The liquid flow in the illustrated apparatus is concurrent with the vapor flow. Line 17 delivers the liquid overflow from the top of stage 1 to the bottom of stage 2. Line 19 delivers the liquid over-flow from top of stage 2 to the bottom of stage 3. Product is withdrawn through line 20 and stored in tank 26.

The heat exchangers 22 and 23 are provided to cool the liquid in lines 17 and 19, respectively, to assist in providing liquid in stages 2 and 3 at the desired temperature. In some designs these heat exchangers may be eliminated by increasing the size of cooling coils 7 and 8. Plates 25 are provided to enhance liquid-gas contact. As is obvious to one skilled in the art, suitable monitoring and control devices interconnected therewith are provided to maintain balanced flow through the system, to produce a product of preselected strength and to control the pressure. Operation of the process of the invention at high pressures allows the use of apparatus considerably smaller in size than that employed in prior art processes.

In another embodiment of the invention, the process is operated in stages using an apparatus similar to that illustrated in FIG. 2 of the drawings; however, absorption in each stage except the last stage is stopped substantially before the oxides of nitrogen content of the gaseous mixture are depleted. Partially absorbed gaseous mixture from each stage is passed to a successive stage where the gaseous mixture is diluted by the addition of an inert gas thereto before absorption is continued. The product nitrite is removed from the last stage.

The invention is further described by the following examples, which serve to illustrate the invention and are not considered to limit it in any respect.

EXAMPLES 1 – 4

Reference is made to FIG. 2 of the accompanying drawing. Column 4 is constructed from 6 inches schedule 10 stainless steel pipe with three separate stages arranged as illustrated in the drawing and assembled to provide concurrent contact of gas and liquid. Each stage is provided with six flat baffle plates that extend 4¾ inches across the column (6⅝ inches ID). The bottom five plates in each stage are spaced 6 inches apart and the top two 3 inches apart. A high-hat separator removed any liquid entrained in the off-gas. Cooling coils 7 and 8 of ⅜ inch tubing (2.26 ft.$^2$ surface area per stage) were placed in the bottom 12 inches of the first and second stages and supplied with sufficient cooling water to maintain the solution at that location in each stage at about 50°C. Suitable receiving and feed tanks were attached to the product discharge line 20 and the green liquor feed line 12.

The data for steady state operation are shown in the Table. Liquid temperature in each stage was measured at a point about one foot above the liquid inlet. The column was activated by establishing a flow of the liquid feed through all stages at the rate indicated whereupon feed gas (line 28) was mixed at the rate indicated with diluent gas (line 31) and introduced into the column at the rates indicated. Feed gas was introduced to the second and third stages as the flow of inert gas from the preceding stages was established. The diluent gas (line 31) at a temperature of 45°C. was obtained from the preparation of the green liquor and had the composition indicated. The pressure in the system was controlled by controlling the pressure of the off-gas (line 21). Periodic analyses were performed on the solution in each stage and on the product liquid and waste gas. These results are reported in the Table.

The invention claimed is:

1. A process for producing in a batch or continuous manner an aqueous solution of a nitrite of an inorganic cation selected from the group consisting of ammonium, alkali metal cations, and alkaline earth metal cations by using a base selected from hydroxides and carbonates of the selected cation, said process comprising the steps of
  1. passing a gaseous mixture containing oxides of nitrogen having a state of oxidation of less than 70 percent into contact with said base to cause a reaction of the base with said oxides of nitrogen and

TABLE

| EXAMPLES | 1 | 2 | 3 | 4 |
|---|---|---|---|---|
| Duration (hrs.) | 6 | 25 | 31 | 52 |
| Gas Feed Rate (lbs/hr) | | | | |
| Total (line 14) | 102 | 84 | 63 | 68 |
| 1st stage (line 28) | 69 | 48 | 33 | 35 |
| 1st stage (line 31) | 128 | 128 | 103 | 132 |
| 2nd stage (line 29) | 18 | 28 | 26 | 27 |
| 3rd stage (line 30) | 15 | 8 | 4 | 6 |
| Gas Composition (lines 28, 29 and 30 — % by volume) | | | | |
| $O_2$ | 5.4 | 5.6 | 4.8 | 4.8 |
| $NO_x$ | 9.7 | 9.6 | 10.0 | 10.0 |
| $H_2O$ | 17.1 | 16.9 | 17.8 | 17.8 |
| Inerts | 67.8 | 67.9 | 67.4 | 67.4 |
| Gas Composition (line 31- % by volume) | | | | |
| $O_2$ | 4.2 | 4.5 | 3.3 | 3.3 |
| $NO_x$ | 0.2 | 0.2 | 0.2 | 0.2 |
| $H_2O$ | 2.0 | 2.0 | 2.0 | 2.0 |
| Inerts | 95.4 | 95.1 | 96.3 | 96.3 |
| Liquid Feed | | | | |
| 1st stage (line 12-lbs/hr) | 121 | 106 | 99 | 106 |
| Composition (% $H_2O$ by difference) | | | | |
| Alkalinity   % NaOH | 12.28 | 10.18 | 9.57 | 9.73 |
| % $NaNO_2$ | 31.59 | 33.86 | 34.81 | 34.63 |
| % $NaNO_3$ | 0.14 | 0.15 | 0.21 | 0.25 |
| 2nd stage (line 17) | | | | |
| Composition (% $H_2O$ by difference) | | | | |
| Alkalinity as   % NaOH | 4.05 | 4.79 | 4.63 | 4.69 |
| % $NaNO_2$ | 38.15 | 38.06 | 39.44 | 39.58 |
| % $NaNO_3$ | 0.32 | 0.29 | 0.35 | 0.42 |
| 3rd stage (line 19) | | | | |
| Composition (% $H_2O$ by difference) | | | | |
| Alkalinity as   % NaOH | 1.80 | 1.12 | 0.66 | 0.90 |
| % $NaNO_2$ | 40.50 | 41.47 | 42.86 | 42.28 |
| % $NaNO_3$ | 0.29 | 0.41 | 0.54 | 0.65 |
| Finished Liquor (lbs/hr) | 145 | 120* | 110* | 120 |
| Composition (% $H_2O$ by difference) | | | | |
| Alkalinity as   % NaOH | 0.04 | 0.02 | 0.02 | 0.03 |
| % $NaNO_2$ | 41.88 | 41.95 | 43.16 | 43.55 |
| % $NaNO_3$ | 0.59 | 0.80 | 0.82 | 0.86 |
| Temperatures (°C.) | | | | |
| Gas Feed (line 14) | 389 | 375 | 350 | 375 |
| 1st stage gas (line 13) | 100 | 80 | 83 | 90 |
| Liquid Feed (line 12) | 51 | 45 | 37 | 36 |
| Liquid in 1st stage (1) | 54 | 52 | 53 | 52 |
| Liquid in 2nd stage (2) | 49 | 51 | 48 | 48 |
| Liquid in 3rd stage (3) | 55 | 60 | 52 | 51 |
| Off-gas (line 21) (lbs/hr) | 203 | 190 | 149 | 182 |
| Composition of Off-Gas (Saturated with $H_2O$ — remainder inerts — % by volume) | | | | |
| $CO_2$(mole %) | 0.04* | 0.04* | 0.04* | 0.04* |
| $O_2$(mole%) | 3.3 | 3.2 | 2.6 | 2.2 |
| $NO_x$ (mole %) | 1.18 | 1.39 | 0.42 | 0.50 |
| Pressure of Off-gas | 60 | 60 | 60 | 80 |

*Estimated 2. adding continuously or in stages, as said reaction proceeds, an inert diluent gas to the gaseous mixture being passed in step (1) to reduce progressively the concentration of oxides of nitrogen in said gaseous mixture as the concentration of said base in said solution is reduced, said state of oxidation being defined as $$\frac{\text{moles e NO}_2}{\text{moles NO} + \text{moles e NO}_2} \times 100$$

wherein e $NO_2$ is determined by adding two times the number of moles of $N_2O_4$ to the number of moles of $NO_2$.

2. The process of claim 1 wherein the concentration of oxides of nitrogen is progressively reduced in step (2) by adding an inert diluent gas to said gaseous mixture prior to contacting said gaseous mixture with said base in step (1).

3. The process of claim 2 wherein the aqueous solution of nitrite is produced in a batch manner and addition in step (2) is continuous.

4. The process of claim 1 wherein operation is in a continuous manner and the concentration of oxides of nitrogen is progressively reduced in stages in step (2) by adding an inert diluent gas to partially absorbed gaseous mixture from step (1).

5. The process of claim 1 wherein the gaseous mixture initially contains less than about 12 parts by volume of oxides of nitrogen based upon the total volume of the mixture, the state of oxidation is less than 50 percent, the initial concentration of base in the aqueous solution is less than 15 percent by weight based upon the weight of solution and the solution is maintained at a temperature in the range 40°–70°C. until substantially all of the base is neutralized.

6. The process of claim 1 wherein the gaseous mixture initially contains about 9–11.5 parts by volume of oxides of nitrogen based upon the total volume of said mixture and the concentration of said oxides in the mixture is reduced by more than about 50 percent on the same basis by the addition of an inert diluent gas before said mixture is contacted with said base.

7. The process of claim 5 wherein the concentration of base is reduced from an initial concentration of about 10 percent to a final concentration of about 0.1 percent and the inert diluent gas is added in an amount sufficient to maintain the ratio of the partial pressure of the nitrogen oxides in the gaseous mixture in absolute atmospheres to the weight percent concentration of base in the solution in contact with the gas at less than about 4.5.

8. The process of claim 7 wherein said ratio is less than 2.0.

9. A process of claim 7 wherein the base is sodium hydroxide.

10. A process for producing an aqueous solution of a nitrite of an inorganic cation selected from the group consisting of ammonium, alkali metal cations and alkaline earth metal cations by using a base selected from the group consisting of the hydroxides and carbonates of the selected cation, said process comprising the stages of a. contacting an initial gaseous mixture containing oxides of nitrogen having a state of oxidation of less than 70 percent with an aqueous solution of said base to reduce the concentration of the base in the solution and to deplete substantially oxides of nitrogen in said initial gaseous mixture;

b. adding an inert diluent gas to an initial gaseous mixture having the composition of the initial gaseous mixture introduced in stage (a) to produce a gaseous mixture of lesser concentration of said oxides of nitrogen than contained in the gaseous mixture used in the previous stage and contacting the gaseous mixture so produced with the solution from the previous stage, said adding and contacting being effected in one or more successive stages until substantially all of said base is reacted and said state of oxidation being defined as $$\frac{\text{moles e NO}_2}{\text{moles NO} + \text{moles e NO}_2} \times 100$$

wherein e $NO_2$ is determined by adding two times the number of moles of $N_2O_4$ to the number of moles of $NO_2$.

11. A process of claim 10 wherein said initial gaseous mixture is obtained from the air oxidation of ammonia.

12. The process of claim 11 wherein gases from the oxidation of ammonia contain about 9–11.5 parts by volume of nitrogen oxides based upon the total volume of said gases and the state of oxidation is less than 50 percent.

13. The process of claim 12 wherein the concentration of base in stage (a) is about 10 percent by weight based upon the weight of solution and the concentration of base from the final stage is about 0.1 percent by weight on the same basis.

14. A process for producing an aqueous solution of a nitrite of an inorganic cation selected from the group consisting of ammonium, alkali metal cations and alkaline earth metal cations by using a base selected from the group consisting of hydroxides and carbonates of the selected cation, said process comprising the stages of a. contacting a solution relatively concentrated in said base as compared to the solution of stage (b) below with a gaseous mixture having about 9.0–11.5 parts by volume of nitrogen oxides with a state of oxidation of less than 70% to reduce the concentration of the base to less than about 15 weight percent, thereby producing a green liquor solution;

b. adding an inert diluent gas to a gaseous mixture having the composition of the gaseous mixture introduced in stage (a) to obtain a gaseous mixture relatively lean in said oxides compared to the gaseous mixture used in the previous stage and contacting the solution produced in the previous stage with the gaseous mixture so obtained to further reduce the concentration of base in said solution; and c. repeating stage (b) until substantially all of the base has been reacted; said stage of oxidation being defined as $$\frac{\text{moles e NO}_2}{\text{moles NO} + \text{moles e NO}_2} \times 100$$

wherein $e$ $NO_2$ is determined by adding two times the number of moles of $N_2O_4$ to the number of moles of $NO_2$.

15. The process of claim 10 wherein the inert diluent gas is off-gas from a prior stage being substantially depleted of oxides of nitrogen.

16. The process of claim 14 wherein the inert diluent gas is off-gas from a prior stage being substantially depleted of oxides of nitrogen.

* * * * *